United States Patent
Choi et al.

(10) Patent No.: US 11,845,336 B2
(45) Date of Patent: Dec. 19, 2023

(54) POWERTRAIN FOR A HYBRID VEHICLE

(71) Applicants: HYUNDAI MOTOR COMPANY, Seoul (KR); KIA CORPORATION, Seoul (KR)

(72) Inventors: Yeong Il Choi, Anyang-si (KR); Ho Rim Yang, Yongin-si (KR); Buhm Joo Suh, Hwaseong-si (KR); Hyuk Joon Kwon, Suwon-si (KR); Seung Wook Lee, Gwangmyeong-si (KR); Seok Joon Kim, Yongin-si (KR); Tal Chol Kim, Bucheon-si (KR); Woul Sun Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/873,349

(22) Filed: Jul. 26, 2022

(65) Prior Publication Data

US 2023/0133383 A1 May 4, 2023

(30) Foreign Application Priority Data

Nov. 2, 2021 (KR) .......................... 10-2021-0148777

(51) Int. Cl.
*B60K 6/40* (2007.10)
*B60K 6/442* (2007.10)
*F16H 37/08* (2006.01)

(52) U.S. Cl.
CPC ................. *B60K 6/40* (2013.01); *B60K 6/442* (2013.01); *F16H 37/0806* (2013.01); *B60Y 2200/92* (2013.01)

(58) Field of Classification Search
CPC ....... B60K 6/40; B60K 6/442; F16H 37/0806; F16H 37/0826
See application file for complete search history.

(56) References Cited

U.S. PATENT DOCUMENTS 9,026,291 B2 * 5/2015 Hayashi ................ B60W 20/00
701/22

FOREIGN PATENT DOCUMENTS

DE 102015222690 A1 * 5/2017 ............ B60W 20/20
KR 20150070488 A 6/2015

* cited by examiner

*Primary Examiner* — Huan Le
(74) *Attorney, Agent, or Firm* — LEMPIA SUMMERFIELD KATZ LLC

(57) ABSTRACT

Disclosed is a powertrain for a hybrid vehicle including a first motor provided to be selectively connected to an engine, a second motor provided to be selectively connected to the first motor, and an output shaft provided to transfer the rotational force of the second motor to drive wheels of the vehicle.

8 Claims, 7 Drawing Sheets

| TRAVEL MODE | ENGAGING ELEMENT | | OPERATING ELEMENT | | |
|---|---|---|---|---|---|
| | CL1 | CL2 | ENG | MG1 | MG2 |
| SERIES HYBRID | | O | O | O | O |
| PARALLEL HYBRID 1 | O | O | O | | O |
| PARALLEL HYBRID 2 | O | O | O | O | O |
| EV 1 | | | | | O |
| EV 2 | O | | | O | O |

FIG. 7

POWERTRAIN FOR A HYBRID VEHICLE

CROSS-REFERENCE TO RELATED APPLICATION

This application claims the priority to and the benefit of Korean Patent Application No. 10-2021-0148777, filed on Nov. 2, 2021, the entire contents of which are incorporated herein by reference.

BACKGROUND

1. Field

The present disclosure relates to a structure of a powertrain for a hybrid vehicle.

2. Description of the Related Art

A powertrain for a hybrid vehicle is configured to use the power of an engine (e.g., an internal combustion engine) and the power of a motor, which is an electric driving force, in order to provide driving force for the vehicle.

The sizes of the engine and the motor mounted in the vehicle, and the connection and arrangement structures thereof have a great influence on the driving efficiency and drivability of the vehicle.

The information disclosed in this Background section is only for enhancement of understanding of the general background of the present disclosure, and should not be taken as an acknowledgement or any form of suggestion that this information forms the related art already known to a person having ordinary skill in the art.

SUMMARY

The present disclosure provides a powertrain for a hybrid vehicle of which the mechanical connection structure is minimized in a series hybrid mode And driving force for the vehicle is distributed to two motors and managed by the same in an electric vehicle (EV) mode, thereby improving the fuel efficiency of the vehicle and fully exhibiting the power performance required for the vehicle while reducing the capacity of the motors mounted in the vehicle.

In accordance with an aspect of the present disclosure, a powertrain for a hybrid vehicle includes: a first motor provided to be selectively connected to an engine, a second motor provided to be selectively connected to the first motor, and an output shaft provided to transfer the rotational force of the second motor to drive wheels of the vehicle.

The first motor and the second motor may be selectively connected via a first clutch, and the first motor and the engine may be selectively connected via a second clutch.

The engine may be connected to the second clutch via a first external gear set, which is constructed such that a first driving gear and a first driven gear are circumferentially engaged with each other.

The second motor may be connected to the output shaft via a second external gear set, which is constructed such that a second driving gear and a second driven gear are circumferentially engaged with each other.

An output gear, meshed with a ring gear of a differential, may be integrated with the output shaft.

In accordance with another aspect of the present disclosure, a powertrain for a hybrid vehicle includes: a first external gear set provided to transmit power of an engine, a second clutch installed to receive power of the engine that has passed through the first external gear set, a first motor provided to be connected to the engine via the second clutch, a first clutch installed to receive power of the first motor, a second motor provided to be connected to the first motor via the first clutch, and a differential provided to receive power of the second motor.

The first external gear set may include a first driving gear, connected to the engine, and a first driven gear, circumferentially engaged with the first driving gear.

An output shaft may be provided between the second motor and the differential, and the second motor and the output shaft may be connected via a second external gear set, whereby the power of the second motor may be reduced and transmitted to the output shaft.

The second external gear set may include a second driving gear, connected to the second motor, and a second driven gear, circumferentially engaged with the second driving gear.

An output gear configured to output power may be integrated with the output shaft, and the output gear may be meshed with a ring gear of the differential.

BRIEF DESCRIPTION OF THE DRAWINGS

The above and other objects, features and other advantages of the present disclosure are more clearly understood from the following detailed description taken in conjunction with the accompanying drawings, in which.

The drawings described herein are for illustration purposes only and are not intended to limit the scope of the present disclosure in any way.

DETAILED DESCRIPTION

Various exemplary embodiments are now described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the present disclosure are capable of being variously modified and taking alternative forms, embodiments thereof are shown by way of example in the drawings, and are described herein in detail. It should be understood, however, that there is no intent to limit the present disclosure to the particular exemplary embodiments disclosed. On the contrary, exemplary embodiments are to cover all modifications, equivalents, and alternatives falling within the scope of the present disclosure.

It should be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of exemplary embodiments of the present disclosure.

It should be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the present disclosure. As used herein, the singular forms "a", "an", and "the" are intended to include the plural forms as well, unless the context clearly indicates otherwise. It should be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. Terms defined in common dictionaries should be interpreted as having the same meanings as terms in the context of the pertinent technology, and should not be interpreted as having ideal or excessively formal meanings unless clearly defined in the specification.

When a component, device, element, or the like of the present disclosure is described as having a purpose or performing an operation, function, or the like, the component, device, or element should be considered herein as being "configured to" meet that purpose or to perform that operation or function.

A description is now given in detail of embodiments disclosed herein with reference to the accompanying drawings. Like reference numerals in each drawing indicate like members.

Figure 1:
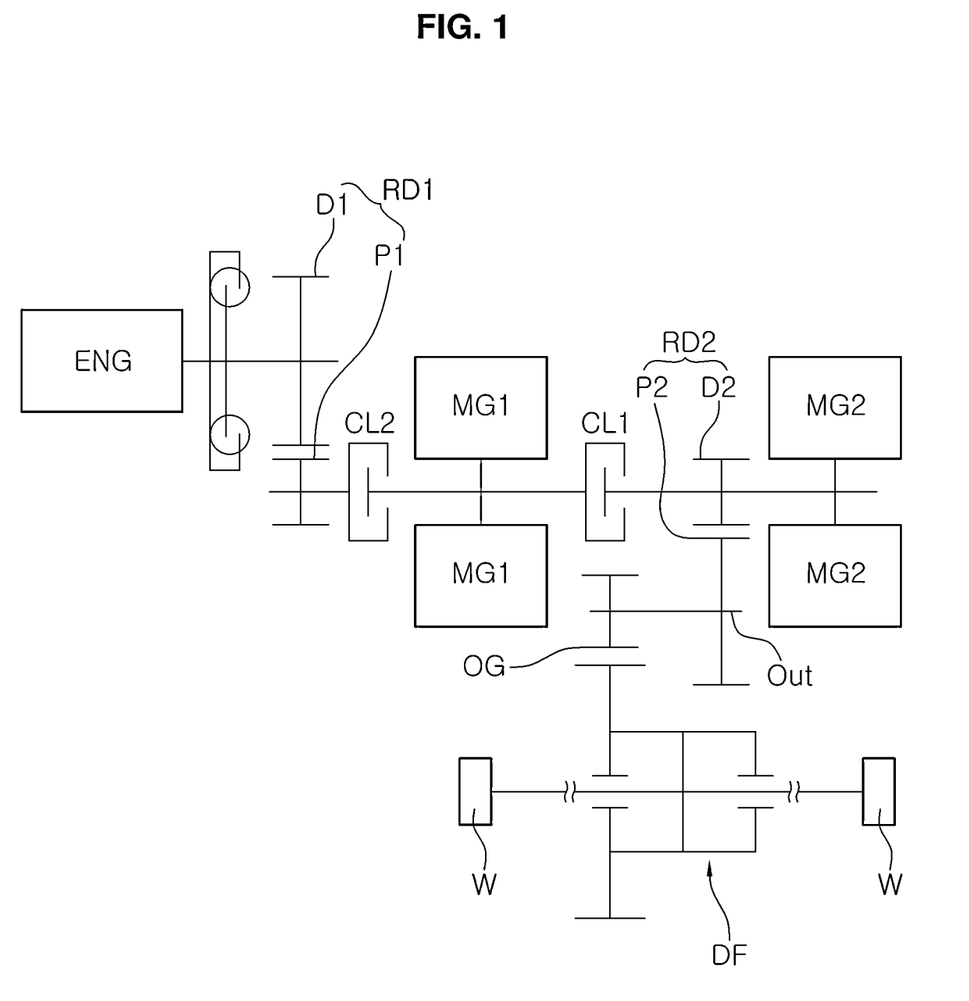
FIG. 1 is a view illustrating the structure of a powertrain for a hybrid vehicle according to one form of the present disclosure.

According to one form of the present disclosure, referring to FIG. 1, an embodiment of a powertrain for a hybrid vehicle includes: a first motor MG1 provided to be selectively connected to an engine ENG, a second motor MG2 provided to be selectively connected to the first motor MG1, and an output shaft OUT provided to transfer the rotational force of the second motor MG2 to drive wheels W of the vehicle.

In other words, the two motors (i.e., the first motor MG1 and the second motor MG2) are provided in the powertrain, and the first motor MG1 is selectively connected to the engine ENG and is also selectively connected to the second motor MG2 And the output shaft OUT is configured to output the rotational force from the second motor MG2.

The first motor MG1 is selectively connected to the second motor MG2 via a first clutch CL1, and the first motor MG1 is selectively connected to the engine ENG via a second clutch CL2.

Here, the first clutch CL1 and the second clutch CL2 may be constructed as friction clutches capable of transferring or cutting off power by continuously changing frictional force.

The engine ENG is connected to the second clutch CL2 via a first external gear set RD1, which is constructed such that a first driving gear D1 and a first driven gear P1 are externally connected to each other.

The second motor MG2 is connected to the output shaft OUT via a second external gear set RD2, which is constructed such that a second driving gear D2 and a second driven gear P2 are externally connected to each other.

In addition, an output gear OG meshed with a ring gear of the differential DF is integrated with the output shaft OUT.

Accordingly, power of the second motor MG2 is reduced by the second driving gear D2 and the second driven gear P2, and transmitted to the output shaft OUT. The transmitted power is then transmitted to the differential DF via the output gear OG, and is transmitted to drive wheels W on the opposite sides.

Meanwhile, the structure of the embodiment of the present disclosure described above may be expressed as follows.

In an embodiment of present disclosure, the powertrain for a hybrid vehicle includes: a first external gear set RD1 provided to transmit power of an engine ENG, a second clutch CL2 to receive power of the engine ENG that has passed through the first external gear set RD1, and a first motor MG1 provided to be connected to the engine ENG via the second clutch CL2. The powertrain further includes: a first clutch CL1 to receive power of the first motor MG1, a second motor MG2 provided to be connected to the first motor MG1 via the first clutch CL1, and a differential DF provided to receive power of the second motor MG2.

Here, the first external gear set RD1 may include a first driving gear D1, connected to the engine ENG, and a first driven gear P1, circumferentially engaged with the first driving gear D1.

An output shaft OUT may be provided between the second motor MG2 and the differential DF, and the second motor MG2 and the output shaft OUT may be connected via a second external gear set RD2, whereby power of the second motor MG2 is reduced and transmitted to the output shaft OUT.

Here, the second external gear set RD2 may include a second driving gear D2, connected to the second motor MG2, and a second driven gear P2, circumferentially engaged with the second driving gear D2.

An output gear OG, which is configured to output power, may be integrated with the output shaft OUT, and the output gear OG may be meshed with a ring gear of the differential DF.

Figure 2:
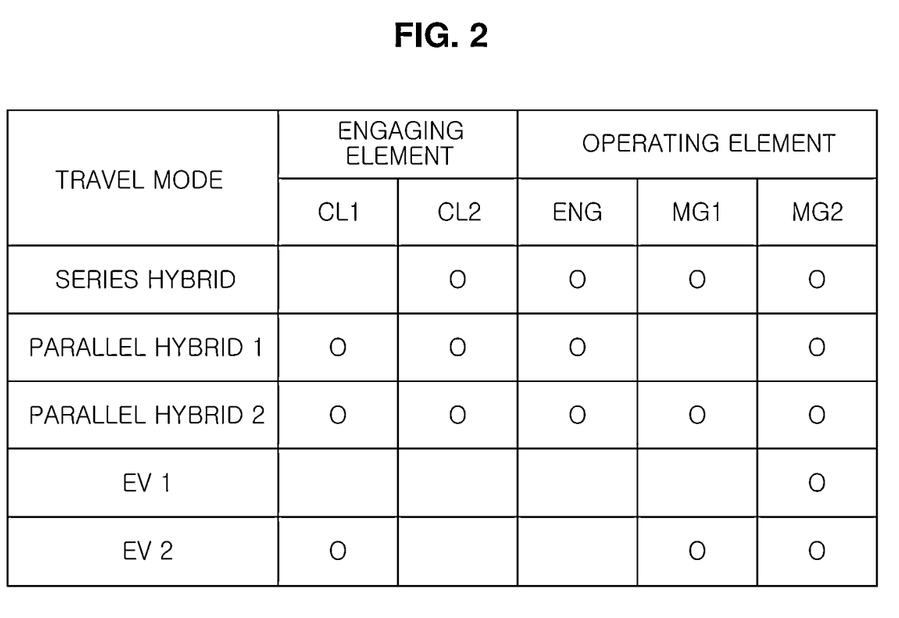
FIG. 2 is an operating mode table of the powertrain of FIG. 1.

The powertrain for a hybrid vehicle of the present disclosure constructed as described above is capable of realizing various travel modes as shown in FIG. 2.

Figure 3:
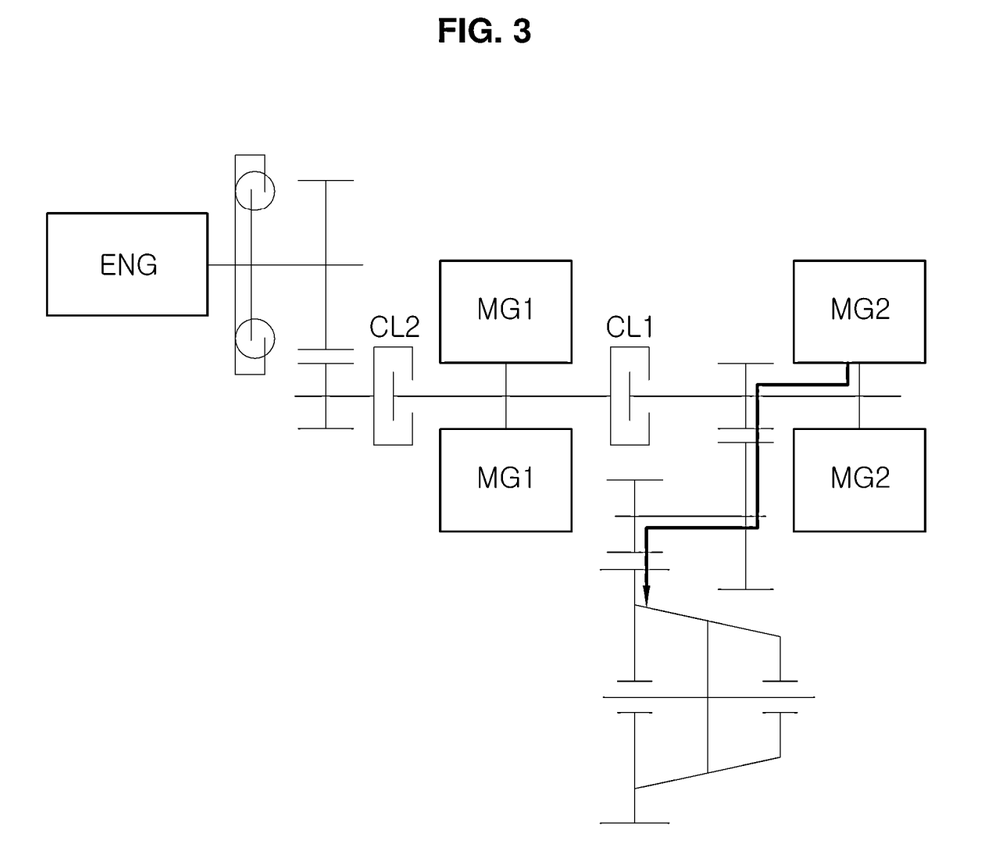
FIG. 3 is a view illustrating realization of an EV1 mode in the powertrain of FIG. 1.

FIG. 3 illustrates realization of an EV1 mode. In the EV1 mode, the second motor MG2 is driven in a state in which the first clutch CL1 is released, whereby power of the second motor MG2 is transmitted to the differential DF through the second external gear set RD2 and the output shaft OUT.

Figure 4:
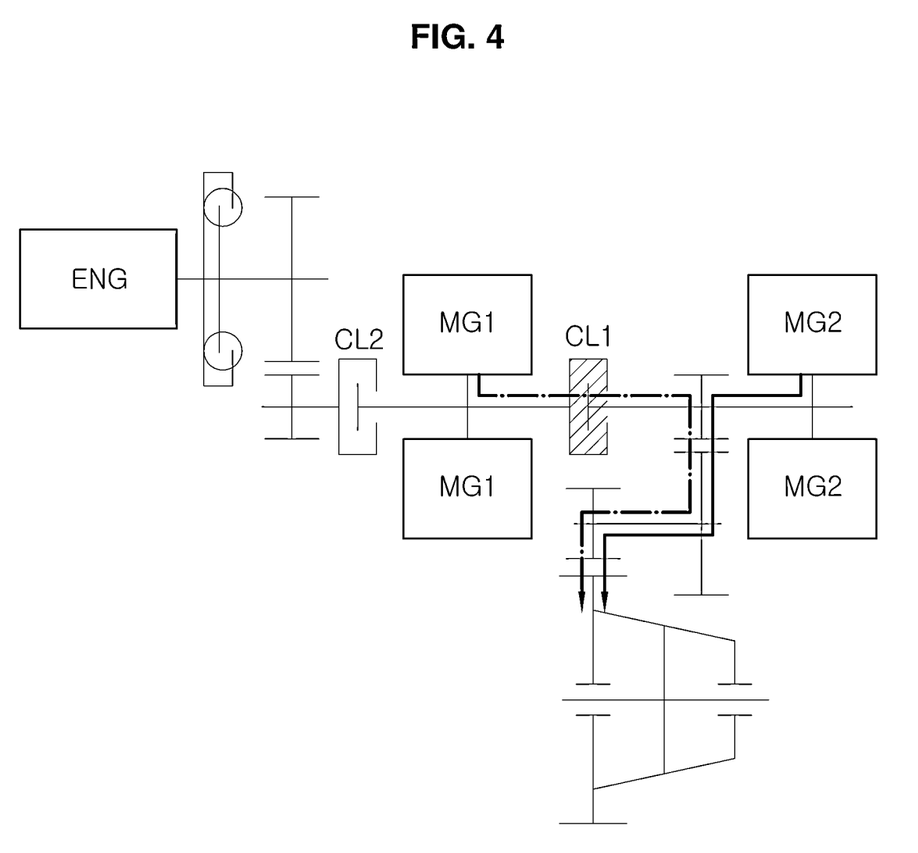
FIG. 4 is a view illustrating realization of an EV2 mode in the powertrain of FIG. 1.

FIG. 4 illustrates realization of an EV2 mode, which is a state in which the first clutch CL1 is engaged and the second clutch CL2 is released. In the EV2 mode, power of the first motor MG1 and power of the second motor MG2 are cut off from the engine ENG and are transmitted to the output shaft OUT through the second external gear set RD2. The second external gear set RD2 includes the second driving gear D2 and the second driven gear P2.

The power transmitted to the output shaft OUT is transmitted to drive wheels W on the opposite sides through the differential DF.

Figure 5:
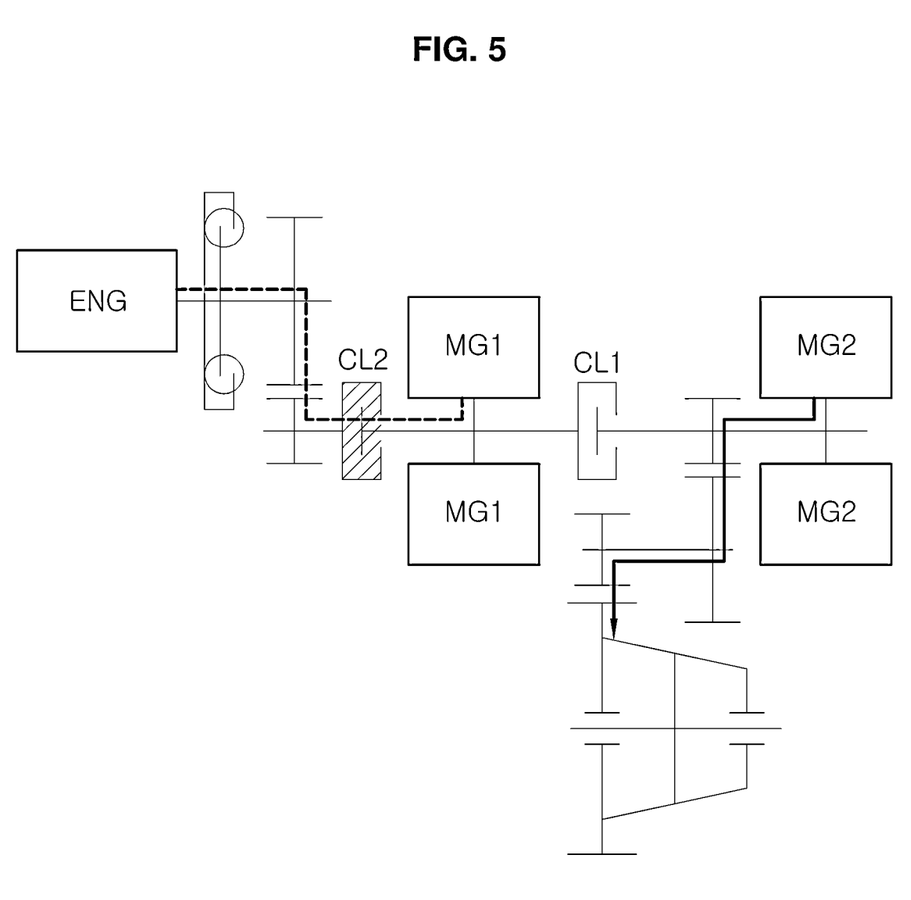
FIG. 5 is a view illustrating realization of a series hybrid mode in the powertrain of FIG. 1.

FIG. 5 illustrates realization of a series hybrid mode, which is a state in which the power of the engine ENG drives the first motor MG1 to generate electricity. In the series hybrid mode, the second motor MG2 is driven by the power generated by the first motor MG1, and the power of the second motor MG2 is transmitted to the drive wheels W through the output shaft OUT and the differential DF.

In this state, the first clutch CL1 is released to ensure that the first motor MG1 and the second motor MG2 are independent of each other, and the second clutch CL2 is engaged to enable the first motor MG1 to be driven by the power of the engine ENG so as to generate power.

Here, the power of the engine ENG is transmitted through the first external gear set RD1 and drives the first motor MG1, thereby allowing the number of rotations of the first motor MG1 to be adjusted to the point at which the first motor MG1 generates power with the highest efficiency while enabling the engine ENG to be operated under optimal operating conditions. Moreover, because the mechanical connection that allows the power of the engine ENG to be transmitted to the first motor MG1 is minimized, the power efficiency of the powertrain may be further improved.

In addition, since the power of the second motor MG2 is reduced and transmitted to the output shaft OUT through the second external gear set RD2, power transmission loss is minimized as far as possible while allowing the maximum climbing capacity required for the vehicle to be easily realized without excessively increasing the capacity of the second motor MG2. The second external gear set RD2 includes the second driving gear D2 and the second driven gear P2.

Figure 6:
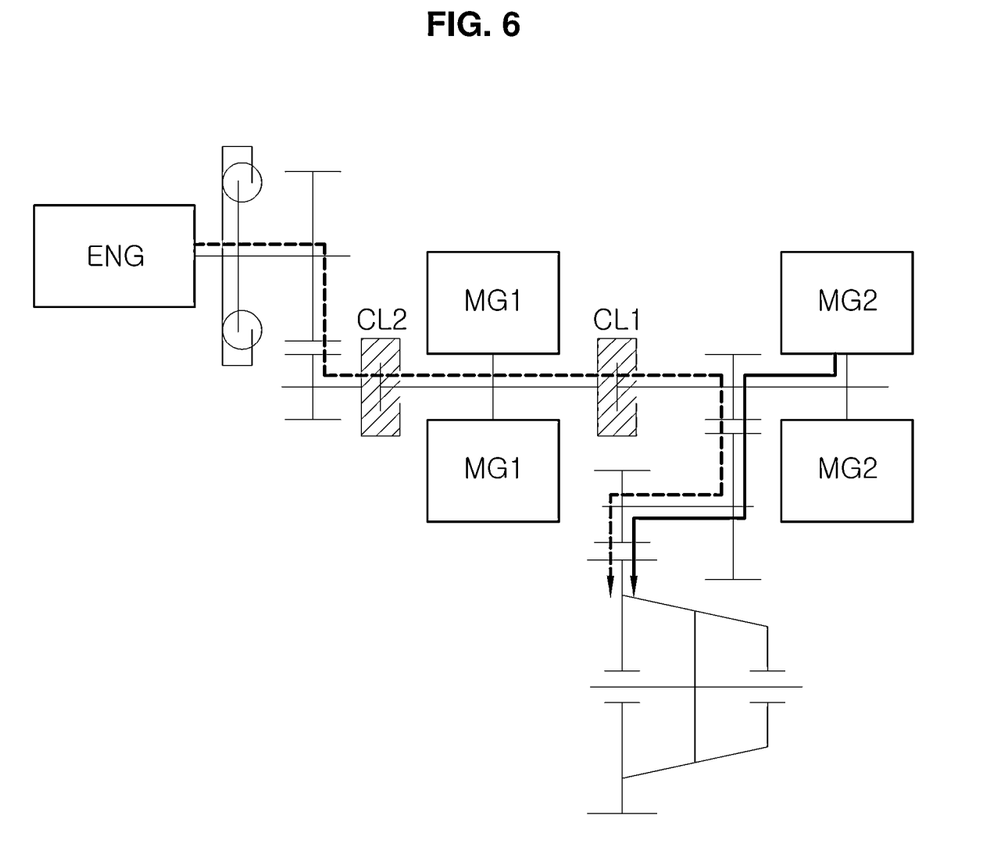
FIG. 6 is a view illustrating realization of a parallel hybrid 1 mode in the powertrain of FIG. 1.

FIG. 6 illustrates realization of a parallel hybrid 1 mode, which is a state in which the engine ENG and the second motor MG2 are driven when both the first clutch CL1 and the second clutch CL2 are engaged. In the parallel hybrid 1 mode, the power of the engine ENG is transmitted to the second motor MG2 through the first external gear set RD1 and the second clutch CL2 and is transmitted to the output shaft OUT together with the power of the second motor MG2.

In this state, the first motor MG1 may not be driven, or may be enabled to generate power.

Figure 7:
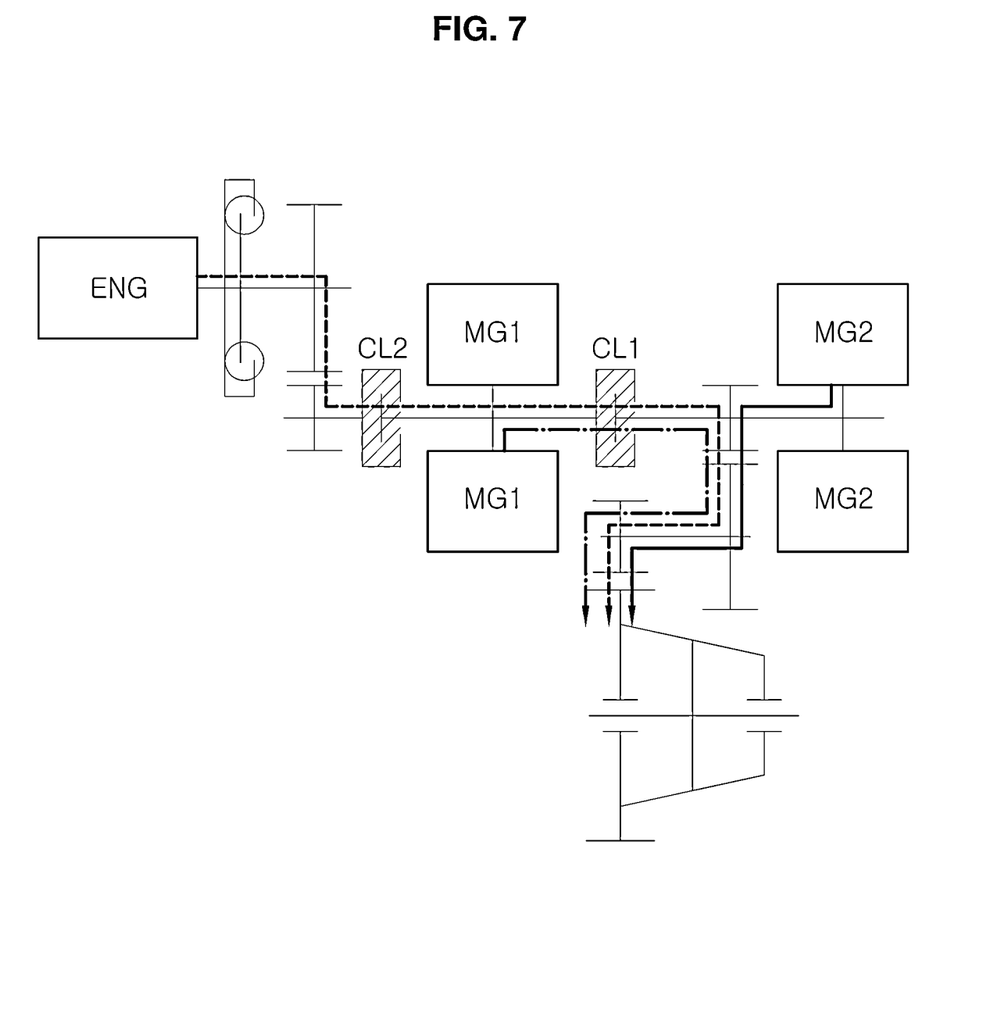
FIG. 7 is a view illustrating realization of a parallel hybrid 2 mode in the powertrain of FIG. 1.

FIG. 7 is a view illustrating realization of a parallel hybrid 2 mode. In the parallel hybrid 2 mode, the engine ENG and the second motor MG2 as well as the first motor MG1 are driven in a state in which both the first clutch CL1 and the second clutch CL2 are engaged. As such, power of the engine ENG, power of the first motor MG1, and power of the second motor MG2 are all transmitted together to the output shaft OUT through the second external gear device RD2. Accordingly, in the parallel hybrid 2 mode, a vehicle can be driven with the greatest output torque, and therefore, the parallel hybrid 2 mode can be used in situations such as rapid acceleration of the vehicle.

As is apparent from the above description, the present disclosure provides a powertrain for a hybrid vehicle constructed such that the mechanical connection structure is minimized in a series hybrid mode and driving force for the vehicle is distributed to two motors and managed by the same in an EV mode, thereby improving the fuel efficiency of the vehicle and fully exhibiting the power performance required for the vehicle while reducing the capacity of the motors mounted in the vehicle.

Although the some embodiments of the present disclosure have been disclosed for illustrative purposes, those having ordinary skill in the art will appreciate that various modifications, additions and substitutions are possible, without departing from the scope and spirit of the present disclosure.

What is claimed is:

1. A powertrain for a hybrid vehicle, comprising:
   a first motor provided to be selectively connected to an engine;
   a second motor provided to be selectively connected to the first motor;
   an output shaft provided to transfer a rotational force of the second motor to drive wheels of the hybrid vehicle; and
   a first driving gear and a first driven gear, which are circumferentially engaged with each other,
   wherein the first motor and the second motor are selectively connected via a first clutch; and the first motor and the engine are selectively connected via a second clutch, and
   wherein the second clutch and the first motor are serially arranged between the engine and the first clutch, and the engine is connected to the second clutch via the first driving gear and the first driven gear.

2. The powertrain according to claim 1, further comprising: a second driving gear and a second driven gear, which are circumferentially engaged with each other,
   wherein the second motor is connected to the output shaft via the second driving gear and the second driven gear.

3. The powertrain according to claim 1, wherein an output gear is integrated with the output shaft and meshed with a ring gear of a differential.

4. A powertrain for a hybrid vehicle, comprising:
   a first external gear set provided to transmit power of an engine;
   a second clutch installed to receive power of the engine that has passed through the first external gear set;
   a first motor provided to be connected to the engine via the second clutch;
   a first clutch installed to receive power of the first motor;
   a second motor provided to be connected to the first motor via the first clutch; and
   a differential provided to receive power of the second motor,
   wherein the second clutch and the first motor are serially deployed between the engine and the first clutch.

5. The powertrain according to claim 4, wherein the first external gear set comprises:
   a first driving gear connected to the engine; and
   a first driven gear circumferentially engaged with the first driving gear.

6. The powertrain according to claim 4, wherein an output shaft is provided between the second motor and the differential, and
   wherein the second motor and the output shaft are connected via a second external gear set, whereby power of the second motor is reduced and transmitted to the output shaft.

7. The powertrain according to claim 6, wherein the second external gear set comprises:
   a second driving gear connected to the second motor; and
   a second driven gear circumferentially engaged with the second driving gear.

8. The powertrain according to claim 7, further comprising: an output gear configured to output power, wherein the output gear is integrated with the output shaft and meshed with a ring gear of the differential.

\* \* \* \* \*